United States Patent
Sangiovanni et al.

(10) Patent No.: US 6,649,561 B2
(45) Date of Patent: Nov. 18, 2003

(54) TITANIA-COATED HONEYCOMB CATALYST MATRIX FOR UV-PHOTOCATALYTIC OXIDATION OF ORGANIC POLLUTANTS, AND PROCESS FOR MAKING

(75) Inventors: Joseph J. Sangiovanni, West Suffield, CT (US); Zissis A. Dardas, Worcester, MA (US); Mariana A. Ioneva, East Hartford, CT (US); Lin Li, Richardson, TX (US)

(73) Assignee: United Technologies Corporation, Hartford, CT (US)

( * ) Notice: Subject to any disclaimer, the term of this patent is extended or adjusted under 35 U.S.C. 154(b) by 95 days.

(21) Appl. No.: 09/792,982

(22) Filed: Feb. 26, 2001

(65) Prior Publication Data

US 2002/0160913 A1 Oct. 31, 2002

(Under 37 CFR 1.47)

(51) Int. Cl.[7] .............. B01J 23/00; B05D 3/02; B32B 15/10; C01G 25/02; C03C 3/00
(52) U.S. Cl. .............. 502/300; 502/350; 502/351; 427/376.2; 427/376.4; 427/315; 427/318; 427/327; 427/436; 428/651; 428/660; 428/457; 428/459; 428/472; 428/472.1; 423/608; 423/610; 501/12; 501/134; 516/90
(58) Field of Search .............. 427/376.2, 376.4, 427/315, 318, 327, 436, 443.2; 428/651, 660, 457, 459, 472, 472.1; 502/350, 351, 300; 423/608, 610; 501/134, 12; 516/90

(56) References Cited

U.S. PATENT DOCUMENTS 4,118,199 A * 10/1978 Volker et al. .............. 422/171
4,297,150 A * 10/1981 Foster et al. ............... 148/6.3
4,833,115 A * 5/1989 Koschlig et al. ............ 502/439
RE33,013 E * 8/1989 Takeuchi et al. ............ 438/116

(List continued on next page.)

FOREIGN PATENT DOCUMENTS

WO          WO96/37280          11/1996

OTHER PUBLICATIONS

Robert J. Hall, et al, "Computational and Experimental Studies of UV/Titania Photocatalytic Oxidation of VOCs in Honeycomb Monoliths" Journal of Advanced Oxidation Technology, vol. 3, No. 3, 1998, pp. 243–252. No month avail.

*Primary Examiner*—Mark L. Bell
*Assistant Examiner*—Patricia L. Hailey
(74) *Attorney, Agent, or Firm*—Stephen A. Schneeberger

(57) ABSTRACT

A titania-coated honeycomb catalyst matrix is provided for the ultraviolet-photocatalytic oxidation of organic pollutants in a flowing fluid. A honeycomb-shaped skeletal structure (12) has a thin, lightweight substrate (18) of metal or ceramic, typically an aluminum alloy, and a surface coating (20) of photocatalyst, such as titania. The photocatalyst (20) is bonded to the substrate (18) via a thin oxide layer (18') on the substrate. The oxide layer (18') may be grown on the substrate. The photocatalyst coating (20) is made by mixing (30) titania powder in a $TiO_2$ sol-gel to form a titania slurry. The substrate with oxide layer is coated (30) with the titania slurry and then heat treated (31). The photocatalyst coating (20) is typically applied to substrate sheets (40, 60, 62) preformed for assembly into a honeycomb-shaped skeletal structure (12) having an array of parallel cells (46, 46'). The coated sheets (40) may have troughs (42) and crests (42), and be stacked (34) with intermediate parting sheets (48). Alternatively, the coated sheets (60, 62) may be notched (64) and interfitted in "eggcrate" fashion. The honeycomb-shaped structure (12) is housed in a frame (50), and one or more stabilizer members (52) fastened to the frame serve to limit displacement of the structure as may be caused by the flowing fluid (14).

19 Claims, 5 Drawing Sheets

U.S. PATENT DOCUMENTS

| | | | |
|---|---|---|---|
| 4,892,712 A | 1/1990 | Robertson et al. | 422/186 |
| 4,996,759 A | 3/1991 | Robertson et al. | 422/186 |
| 5,032,241 A | 7/1991 | Robertson et al. | 204/157.15 |
| 5,096,745 A * | 3/1992 | Anderson et al. | 427/226 |
| 5,126,111 A | 6/1992 | Al-Ekabi et al. | 422/186.3 |
| 5,223,318 A * | 6/1993 | Faber et al. | 428/116 |
| 5,395,600 A * | 3/1995 | Cornelison | 422/180 |
| 5,514,454 A * | 5/1996 | Boire et al. | 428/216 |
| 5,516,532 A | 5/1996 | Heller et al. | 502/242 |
| 5,616,532 A * | 4/1997 | Heller et al. | 502/242 |
| 5,658,841 A * | 8/1997 | Tanaka et al. | 502/305 |
| 5,753,322 A * | 5/1998 | Yamaguchi et al. | 428/14 |
| 5,790,934 A | 8/1998 | Say et al. | 422/186 |
| 5,835,840 A | 11/1998 | Goswani | 422/186.3 |
| 5,849,200 A | 12/1998 | Heller et al. | 210/748 |
| 5,854,169 A * | 12/1998 | Heller et al. | 502/242 |
| 5,897,958 A * | 4/1999 | Yamada et al. | 446/474 |
| 5,933,702 A | 8/1999 | Goswani | 422/186.3 |
| 5,972,831 A * | 10/1999 | Poncelet et al. | 502/304 |
| 5,993,738 A | 11/1999 | Goswani | 422/22 |
| 6,063,343 A | 5/2000 | Say et al. | 422/186.3 |
| 6,103,363 A * | 8/2000 | Boire et al. | 428/325 |
| 6,106,955 A * | 8/2000 | Ogawa et al. | 428/469 |
| 6,107,241 A * | 8/2000 | Ogata et al. | 502/350 |
| 6,326,079 B1 * | 12/2001 | Philipe et al. | 428/325 |
| 6,368,668 B1 * | 4/2002 | Kobayashi et al. | 427/376.2 |
| 6,387,446 B1 * | 5/2002 | Lobmann et al. | 427/372.2 |
| 6,429,169 B1 * | 8/2002 | Ichinose | 502/350 |
| 6,455,465 B1 * | 9/2002 | Miyasaka | 502/350 |

* cited by examiner

TITANIA-COATED HONEYCOMB CATALYST MATRIX FOR UV-PHOTOCATALYTIC OXIDATION OF ORGANIC POLLUTANTS, AND PROCESS FOR MAKING

TECHNICAL FIELD

This invention relates to the removal of organic pollutants from a fluid stream, and particularly to a structure for the photocatalytic oxidation of such pollutants and to the method of making such structure.

BACKGROUND ART

It is now relatively well known that a photocatalytic process may be used to cleanse a fluid stream, typically an air stream, of organic pollutants. A photocatalyst, such as titania ($TiO_2$, titanium dioxide), may be supported on some form of skeletal, or support, structure to provide a catalyst matrix for photochemical activation and cleansing interaction with organic contaminants in the fluid stream. A source of ultraviolet illumination serves to activate the photocatalyst. This type of air purifier may find use in a number of applications, and particularly in an enclosed environment such as a room or the interior of a vehicle. Recent focus has been on the use of such purifiers in buildings, automobiles and aircraft.

Numerous formulations of photocatalysts, as well as the process for their application and adherence to supporting substrates, have been disclosed. Moreover, numerous configurations and materials have been disclosed and/or used for the support of photocatalyst material. Examples of such formulations and/or structures may be found in the following patent publications, including PCT published application WO 96/37280 for PCT Application US96/05103 assigned to the assignee of the present application, as well as U.S. Pat. Nos. 6,063,343; 5,993,738; 5,993,702; 5,854,169; 5,849,200; 5,835,840; 5,790;934; 5,616,532; 5,126,111; 5,032,241; 4,966,759; and 4,892,712.

Typically, the preferred photocatalyst is a coating of $TiO_2$ on a supporting substrate of any of various materials having various geometries. In some instances, the supporting substrates are meshes of fiberglass or similar material, e.g., ceramic and metallic foams, whereas in others they are fins or honeycomb-type structures. With respect to mesh-type substrates, a large fraction of the supported catalyst is essentially inactive because the inherent structure of these materials obscures the necessary ultraviolet illumination. Moreover, there may be difficulty in obtaining a uniformity or consistency of flow characteristics from one unit to another because of the amorphous or random nature of fluid passages in meshes, particularly after being coated with a photocatalyst. Fin-type supporting structures may be arranged to provide more uniform characteristics, but are often complex in their manufacture and assembly. Moreover, some such fin or honeycomb-type supporting structures have been of paper or ceramics, but paper has the limitations of low structural integrity and relatively short lifetime, and many of the ceramics may have a relatively high manufacturing cost, excessive weight and low mechanical durability due to brittleness. Moreover, the materials used in some such supporting structures and/or their assembly may give rise to the release of objectionable volatile organic compounds (VOCs) during operation.

In addition to the considerations about the suitability of the structural support, there is the further concern regarding the formulation and application of the photocatalyst to the selected structural support. The photocatalyst coating must posses the desired catalytic properties, while also being relatively economical to formulate, apply and continue to use. In this latter regard, it is important that the photocatalyst form a durable bond with the supporting substrate to prevent transfer of catalyst to the fluid stream being processed.

Accordingly, it is an object of the invention to provide a structural support for a photocatalyst which is of relatively low cost, light weight, high structural integrity, possesses good flow characteristics, and can be illuminated effectively by an external ultraviolet source.

It is a further object of the invention to provide a photocatalytic coating for such structural support which is adherent, durable, and possesses good photocatalytic properties.

It is a still further object of the invention to provide a photocatalyst and support therefore, which are not themselves a source of VOCs during operation.

DISCLOSURE OF INVENTION

The present invention provides an improved honeycomb photocatalyst matrix for purifying fluid flowing therethrough. The honeycomb photocatalyst matrix comprises a honeycomb-shaped skeletal structure of lightweight material, possibly a ceramic or more typically a metal, such as aluminum, formed or assembled as an array of multiple, substantially parallel cells open at opposite ends for fluid flow therethrough and illumination therewithin, the cells having respective surfaces, and a coating of photocatalyst on the surfaces of the cells, whereby the coated surfaces are activated by ultraviolet illumination to remove contaminants from fluid flowing through the cells.

The honeycomb-shaped skeletal structure of one embodiment is formed of a plurality of metal sheets, each having an alternating series of crests and troughs, and the sheets are stacked such that the crests and troughs form the respective cells. Planar metal parting sheets may be interposed between the sheets having troughs and crests. The metal is preferably aluminum, and may be about 0.002 inch in thickness.

In another embodiment, the metal sheets which define the cells are planar, and a portion of the sheets are oriented orthogonally to and interfitted with the remainder of the sheets, in substantially eggcrate fashion, to define the cells.

A frame is included about the outer perimeter of the honeycomb-shaped skeletal structure to maintain stability transverse to fluid flow, and one or more stabilizer members joined with the frame serve to resist displacement of the structure relative to the frame in the direction of fluid flow. The stabilizer members may be adjacent to one, or both, end faces of the cell structure, or may extend therethrough. The entire structural assembly is made without including volatile organic compounds (VOCs) as structural or bonding materials, since VOCs degrade when exposed to ultraviolet light.

A durable, adherent, photocatalytic coating is provided on the substrate material via the use of a ceramic interface material to promote adhesion of the photocatalyst. Although the substrate may itself be a, or the, ceramic material that provides such interface, the use of a thin metal sheet substrate (such as aluminum) having a ceramic layer formed thereon is preferred. Prior to coating, the aluminum sheets are provided with a ceramic oxide layer on one or both surfaces. The oxide layer may be grown or native. Titania powder is then mixed in a $TiO_2$ sol-gel solution to form a titania slurry. The oxidized surfaces of the aluminum substrate are coated with the titania slurry, and the coated substrate is then heat treated to calcine, harden, and bond the titania coating to the substrate.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
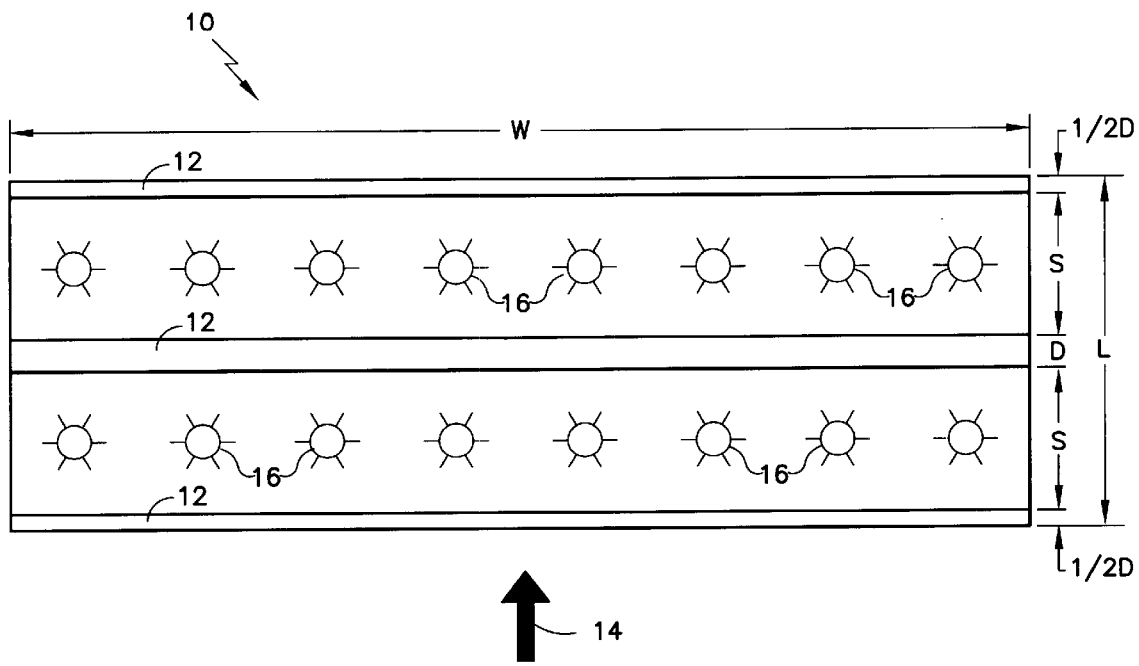
FIG. 1 is a simplified diagrammatic top view of a photocatalytic fluid purifier employing photocatalytic honeycomb monoliths in general accordance with the invention.

Referring to FIG. 1, there is depicted a photocatalytic fluid purifier 10 having photocatalytic honeycomb monoliths 12 in accordance with the invention. The purifier 10 is used to remove organic contaminants from a fluid stream using the known process of a photocatalytic reaction. In the illustrated embodiment, the fluid stream is air, though it might be other gases and/or liquids. This technology is effective at converting harmful volatile organic compounds (VOCs) to generally non-toxic compounds via photocatalytic oxidation, and is also effective at killing bioaerosols. The purifier 10 may be used in a number of generally enclosed environments, such as rooms and vehicles, but the illustrated embodiment will be discussed in the context of use for purifying air for an aircraft cabin. In such instance, size, weight, durability, etc. may take on added significance.

Air flows through the purifier 10 in the direction illustrated by arrow 14. Essentially, organic pollutants in the air stream 14 contact and adsorb on a photocatalytic semiconductor (hereinafter "photocatalyst") in the monoliths 12. The photocatalyst is activated by ultra-violet (UV) illumination from the array of UV lamps 16 arranged adjacent to, or between, the photocatalytic honeycomb monoliths 12. Water molecules, which also adsorb on the photocatalyst surface, dissociate to form hydroxyl radicals which oxidize the organic pollutants adsorbed on the photocatalytic coating.

In the illustrated embodiment, the honeycomb monoliths 12 at opposite ends of purifier 10 have only ½ the thickness, or depth, D, of the intermediate monolith(s) 12 because they are only illuminated from one side, whereas the intermediate monolith(s) receive illumination from both sides to twice the cumulative depth. In the example, honeycomb monolith thickness, or depth D, is about 1 inch, the width, W, of the purifier 10 is about 32 inches, successive honeycomb monoliths 12 are spaced, S, about 4.5 inches, and the total length, L, of the purifier 10 is about 11 inches. The height (not seen) of the active face of the purifier 10 is about 23 inches. It will be understood that dimensions W, L, and H are variables depending on the fluid flow rate and specific applications. Dimension S can vary from slightly more than the diameter of lamp 16 to about 6 inches, depending on the power supplied to the lamps. Only dimension D is relatively fixed at 1 inch or ½ inch for optimum performance.

Figure 2:
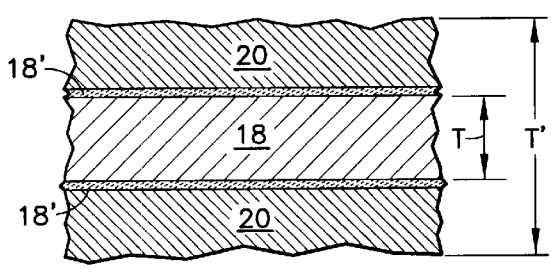
FIG. 2 is a graphic sectional view of a single substrate sheet and photocatalyst coating according to an aspect of the invention as employed in the photocatalyst honeycomb monoliths of another aspect of the invention.

Referring to FIG. 2, there is depicted an enlarged graphic sectional view of a substrate 18 and photocatalytic coating 20 in accordance with an aspect of the invention. The substrate 18 is preferably lightweight, durable and not a source of volatile organic compounds (VOCs). Moreover, the substrate 18 must be conducive to the existence or placement of an adherent oxide layer or coating 18' at its surface, or surfaces, to support and promote adhesion of the photocatalyst coating 20 thereto. In the broadest sense of the invention, the substrate 18 may be a ceramic or metal, and the oxide surface layer(s) 18' may either be applied via a separate application or growth step, or it may be native to the substrate material as obtainable from a supplier. In the event a ceramic is chosen as substrate 18, it might be an oxide such as silicon dioxide (silica) ($SiO_2$) or aluminum oxide ($Al_2O_3$), in which instance the surface layer 18' and the substrate 18 would be one and the same. However, for purposes of the present description, the substrate 18 will be described in the context of a lightweight metal, and particularly aluminum. As used in this context herein, the term "aluminum" shall also include alloys of aluminum, such as AMS 5052. Moreover, although the aluminum substrate 18 may be obtained with a native layer of aluminum oxide (alumina) $Al_2O_3$ already on its surface(s), the invention will be described in the context of a process for adding a surface layer of oxide (ceramic) such as alumina to the aluminum substrate. It will also be convenient from time to time to refer only to the substrate 18, where the clear intent is that the surface oxide layer 18' is also included.

As illustrated in FIG. 2, the substrate 18 has a thickness T, provided by a sheet of aluminum foil having a thickness of about 0.002 inch (50 $\mu$m). The surface layer or coating of oxide 18' is perhaps 0.1 to 0.5 $\mu$m or only $\frac{1}{100}^{th}$ the thickness T of substrate 18. The nominal thickness of the photocatalytic coating 20 at each surface of substrate 18 for best activity is about 8 to 10 $\mu$m or about $\frac{1}{5}^{th}$ the thickness of the substrate, such that the substrate and photocatalytic coatings on both surfaces thereof have a cumulative thickness, T', of less than about 0.003 inch (75 $\mu$m).

Figure 3:
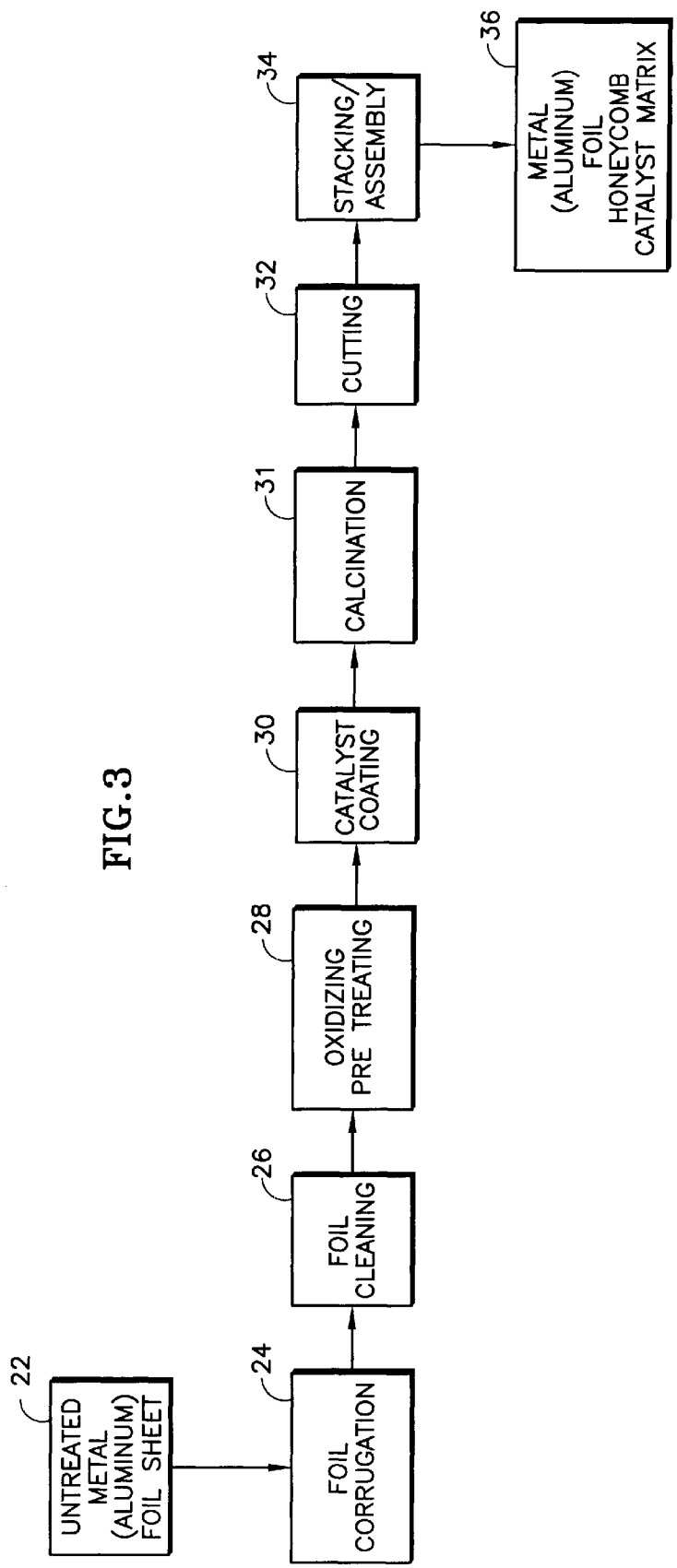
FIG. 3 is a simplified manufacturing process flow diagram for the photocatalytic honeycomb monoliths of the invention.

Additional reference is now made to FIG. 3 in describing the process for providing an adherent photocatalytic coating 20 on a substrate 18, in this instance of aluminum. The photocatalyst of coating 20 is titanium dioxide (titania) $TiO_2$, though other similar photocatalyst materials may provide similar benefits. Function blocks 22 and 24 of FIG. 3 represent, respectively, the provision of an untreated sheet of metal (aluminum) foil and the mechanical configuring of the foil in accordance with an aspect of the invention to be described later in greater detail herein. The aluminum foil has a thickness of about 0.002 inch (0.05 mm), and is cleaned at function block 26. The cleaning process includes washing with soap and warm deionized water, a subsequent rinse with deionized water, and methanol, and drying in ambient air.

Assuming the foil does not already have an adequate native layer of oxide (alumina), it is necessary to form the oxide layer 18' through an oxidizing pretreatment step represented by block 28. The layer(s) 18' of alumina ($Al_2O_3$)

is grown by a wet oxidation process in which the aluminum substrate 18 is placed in a moist air environment at a relative humidity of about 95% and is heated at about 85° C. for about one (1) hour. Although depicted separately, this oxidation process might be combined with the cleaning step of block 26.

Function block 30 represents the titania coating process, which includes the following detailed steps. The titania coating 20 is deposited by dip coating the pretreated aluminum foil 18, 18' in a homogeneous slurry consisting of P-25 titania powder ($TiO_2$) (by DeGussa) dispersed in $TiO_2$ sol-gel. It will be appreciated that the foil 18, 18' may be coated with the titania slurry using other coating techniques, such as spray coating or the like. The slurry is prepared by mixing the ball-milled powder (P-25) with a homogeneous sol-gel solution, and is followed by ball milling for achieving homogeneity.

A suitable and representative method and formulation for the preparation of TiO2 sol-gel is described in detail in the aforementioned PCT published patent application WO 96/37280 which is incorporated herein by reference. Briefly, 300 mL of deionized water was mixed with 1.79 mL of 70 wt % $HNO_3$ in a three-neck distilling flask. Another solution was prepared by mixing 16.54 mL of titanium isopropoxide $Ti(O-iPr)_4$ with 30 mL isopropanol(I—PrOH). The second solution was added drop-wise into the three-neck distilling flask with the aid of a dropping funnel while the mixture was stirred vigorously. The mixture was further stirred for half an hour at room temperature, followed by reflux at 80° C. for 12 hours.

A summary of the molar ratios of the reactants used for the $TiO_2$ sol-gel synthesis is shown in Table 1.

TABLE 1

| $TiO_2$ Sol-gel | $Ti(O-iPr)_4$ | i-PrOH | $H_2O$ | $HNO_3$ |
|---|---|---|---|---|
| #1 | 1 | 7.2 | 300 | 0.36 |
| #2 | 1 | — | 280 | 0.09 |

It was determined that a maximized combination of photoactivity (as shown for 1-butene photocatalytic oxidation) and adhesion could be obtained by maintaining the P-25 titania loading in the slurry in a range from 20 wt % to 30 wt %, and the weight of P-25 coated on unit area of the aluminum foil 18 should be maintained in the range from 0.8 to 1.0 mg/$cm^2$. A summary of the combination of those relevant conditions is shown in Table 2.

Subsequent heat treatment of the coating is a calcining step, which is represented by function block 31, preferably in the temperature range from 150° C. to 250° C. for at least 2 hours. The resulting coated substrate is generally as depicted in FIG. 2.

The adhesion of the coating 20 has been tested by a tape test similar to the one described in ASTM D3330M-96, in which tape is adhered to the dried coating and then removed to evaluate the adhesion of the coating 20 to the substrate 18. The coating 20 formed in accordance with the invention was compared with a coating consisting of P-25 only. The adhesion test revealed that the coating formed in the presence of the $TiO_2$ sol-gel performs better, i.e., adheres better, than the one coated without the sol-gel. The durability of the coating 20 was tested by exposing it, in a humidity chamber, to a relative humidity of 95% at 25° C. for 48 hours. No changes in the adhesion and the photoactivity were observed for the preferred coating under those conditions.

Having described the desired coating process depicted in a portion of FIG. 3, the remainder of that Figure is directed to the formation of a photocatalytic honeycomb monolith 12 in accordance with an aspect of the invention. Returning to function block 24, the aluminum foil substrate 18 is formed, as by pressing, rolling, stamping, or similar deforming process, to a generally corrugated shape having an alternating series of troughs and crests which define fin-like cell wall surfaces. This forming function occurs prior to the coating process of block 30 in order to provide a finish shape upon which to place the coating. Function block 32 depicts the step of cutting the corrugated and photocatalytic-coated aluminum foil 18 to appropriate lengths, and if necessary, widths, to provide the sheets 40 seen in FIG. 4. The corrugated sheets 40 are illustrated as having alternating fin-like troughs 42 and crests 44, which are shown here as being of rectilinear or "square-wave" shape. It will be understood, however, that other geometries including curved undulations, saw tooth, etc., may also be used. The selection of fin geometry of the corrugated sheets 40 is based on an optimized combination of maximum surface area per unit volume, maximum accessibility of UV light, and low manufacturing cost.

Figure 4:
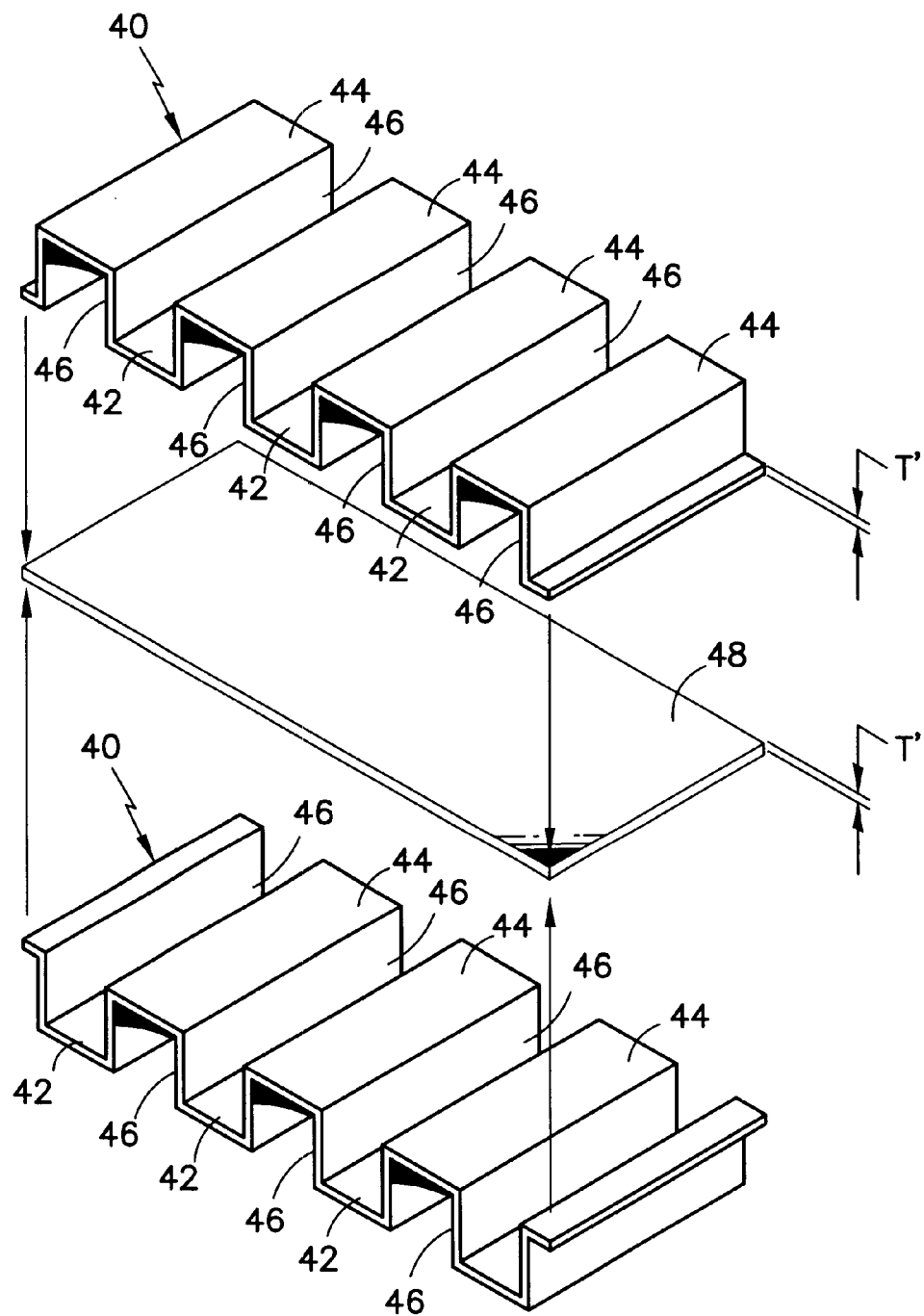
FIG. 4 is an exploded diagrammatic perspective view illustrating one embodiment of the photocatalyst-coated structural core members of the invention.

Referring further to FIGS. 3 and 4, and additionally to FIGS. 6A–6D, the corrugated sheets 40 are stacked (and assembled) at step 34 in such a manner that the fin-like trough 42 and crest 44 surfaces of the corrugations create the walls of honeycomb cells 46. The corrugated sheets 40 are cut and stacked such that the troughs 42 of one sheet underlie, or overlie, the crests 44 of the next adjacent sheet.

TABLE 2

| # | WT % P-25 IN THE SLURRY | WEIGHT OF P-25 COATED ON UNIT AREA (y), in mg/$cm^2$ VS # OF DIPPINGS (x) y = f (x) | # OF DIPPINGS REQUIRED TO COAT 1 mg/$cm^2$ of titania, i.e., P-25 and titania sol-gel # | MAXIMUM # OF DIPPINGS WITH GOOD ADHESION** # | RATE OF PHOTO-OXIDATION OF 1-BUTENE* μmole/cm*h |
|---|---|---|---|---|---|
|  | Pure P-25 |  |  |  | 0.45 |
| 1 | 20 | y = 0.4136x + 0.0209 | 2.3 | 2 | 0.425 |
| 2 | 25 | y = 0.7295x + 0.0146 | 1.3 | 1 | 0.415 |
| 3 | 30 | Y = 0.9902x | 1.0 | 1 | 0.426 |

*at 25° C.; interpolated from experimental data to 1 mg/$cm^2$ P-25
at a speed of 80 mm/min To prevent successive corrugated sheets 40 from nesting, with trough in trough and crest in crest, during stacking and handling, a parting sheet 48 is placed between each adjacent pair of sheets 40. The parting sheets 48 are similarly of thin aluminum foil and are similarly coated with the same photocatalyst as the corrugated sheets 40. However the parting sheets 48 remain planar, and are not subjected to the corrugation forming step. The presence of the parting sheets 48 prevents nesting of adjacent corrugated sheets 40, even if some degree of misalignment does occur. In fact, the parting sheets 48 serve as walls to the cells 46 in alternating columns and rows to provide uniform cell size. In the illustrated embodiment, the cells 46 may have a flow length of 1 inch (or ½ inch if at end locations of the purifier 10**) and an effective cross-sectional diameter or average dimension of about ⅛ inch (3.2 mm).

To finish the assembly of a photocatalytic honeycomb monolith 12, as represented by block 36 in FIG. 3, it is necessary to provide a housing frame 50 (seen in FIGS. 6A–6D) which surrounds the outer perimeter of the assembly of stacked corrugated sheets 40 and included parting sheets 48. The housing frame 50 is typically provided by a lightweight, U-shaped, metal channel member which is formed to bend into an encircling enclosure tightly about the periphery of the stacked sheets 40 and 48. The ends of the frame 50 may be joined be suitable means which do not introduce any VOCs, as for example mechanical fasteners including tabs, rivets, etc., or even metal bonds such as welds. In addition to capturing and binding the stacked sheets 40 and 48, the frame 50 serves to seal the periphery against fluid leaks by the flow stream 14 being cleansed.

Figure 6A:
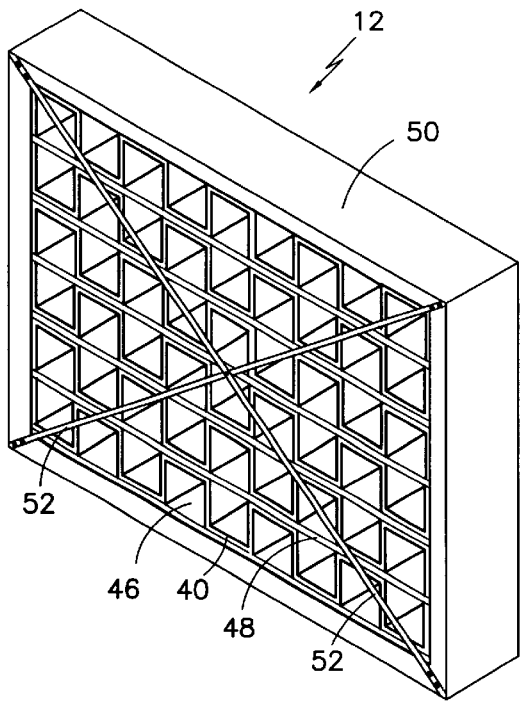
FIGS. 6A through 6D are diagrammatic perspective views of the photocatalyst-coated structural cores assembled as monoliths, or modules, including frames and reinforcing members in accordance with respective differing embodiments.
Figure 6B:
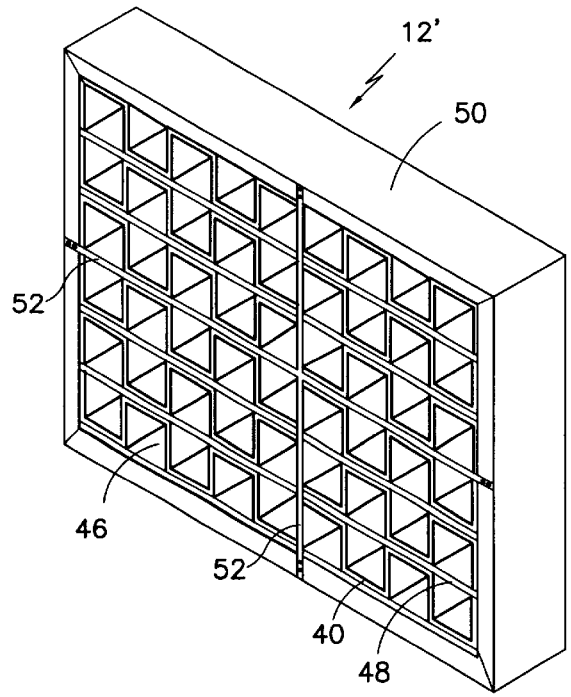
Figure 6C:
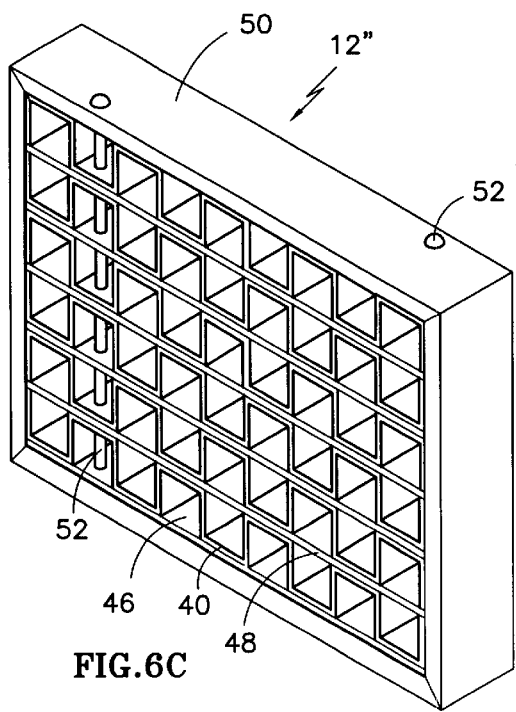
Figure 6D:
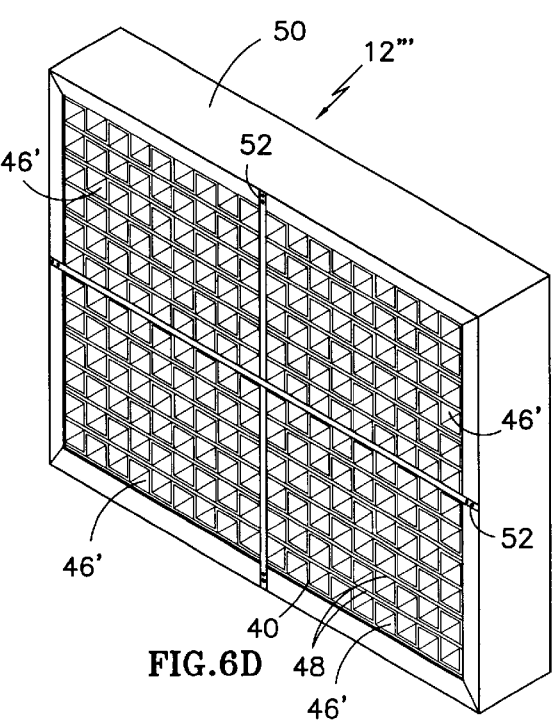

To prevent or minimize displacement of the core, or stack of sheets 40 and 48, within frame 50 as a result of forces generated by the fluid flow 14, it may be desirable to provide further stabilization in the direction of flow. To that end, FIGS. 6A–6D depict alternative forms of stabilizing members, which typically take the form of metal or ceramic pins or bars 52. The stabilizer pins 52 are sufficiently rigid to resist displacement of the core by the fluid flow forces, but relatively small in cross-section to minimize interference with fluid flow and the entry of illumination to cells 46. In FIG. 6A, a pair of stabilizer pins 52 are arranged in "X" fashion across each of the opposite end faces of the honeycomb monolith 12, and are fastened to frame 50 without the use of materials creating VOCs, as by rivets or the like. In FIG. 6B, a pair of stabilizer pins 52 are arranged in "cross" fashion across each of the opposite end faces of the honeycomb monolith 12', and fastened to frame 50. FIG. 6C depicts another positioning of the stabilizer pins 52 wherein they are inserted through the body of the honeycomb monolith 12", as for instance through pre-formed and pre-aligned holes (not shown) drilled in the stacked sheets 40 and 48. Those pins 52 may extend into, or through, similar holes in the frame 50 and be suitably fastened thereto. FIG. 6D depicts a honeycomb monolith 12''' that differs in that instead of a single core, or stack of sheets 40 and 48, it contains four "mini-cores" in the same space. The cells 46' of the mini-cores may be smaller, as depicted, or not. Also, the stabilizer pins 52 are arranged in a "cross" fashion similar to that of FIG. 6B to not only serve as stabilizers, but to also capture the inner perimeters of the several minicores.

Figure 5:
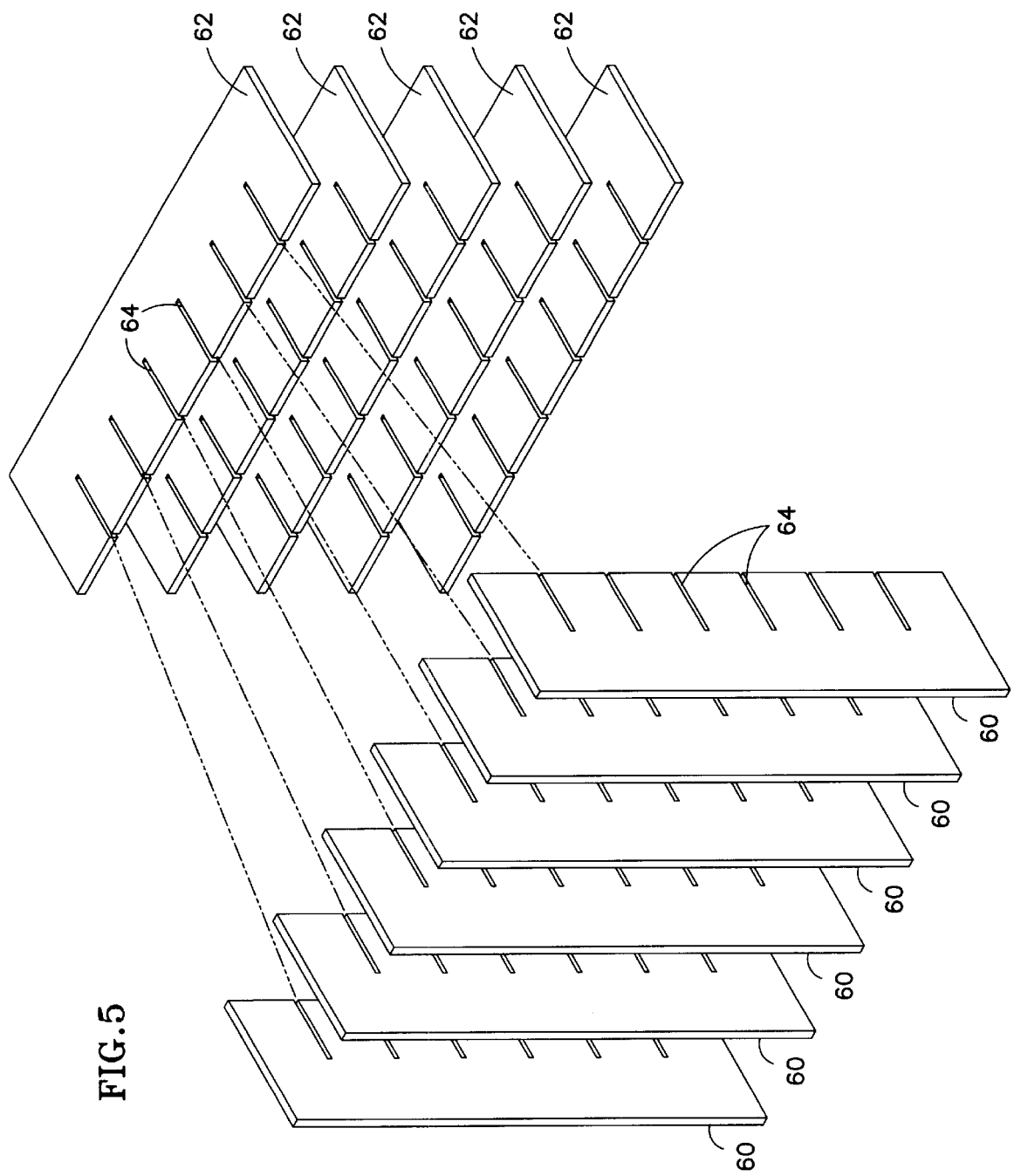
FIG. 5 is an exploded diagrammatic perspective view illustrating another embodiment of the photocatalyst-coated structural core members of the invention.

Although the honeycomb monolith core structure of the embodiments depicted in FIGS. 3, 4, and 6A–6D was formed through the use of a stacked arrangement of corrugated, photocatalyst-coated sheets, certain aspects of the invention also apply to similar cores formed in differing manners. For instance, referring to FIG. 5, the honeycomb core structure may use an array of thin, lightweight sheets 60 and 62 of metal or ceramic, provided with a photocatalyst coating as described previously. However, instead of sheets 60 and 62 being corrugated to create cells when stacked in the manner described, the sheets remain planar and instead are provided with slots 64 at spaced intervals along an edge thereof. The sheets 60 are oriented orthogonally to the sheets 62, and the slots 64 in each are sized, positioned and spaced such that sheets 60 and 64 may be interfitted with one another in "eggcrate" fashion, thereby forming the cells of the honeycomb core structure. As previously, no materials or processes which could give rise to VOCs during operation of the purifier 10 are utilized in the formation of the honeycomb monolith.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. The method of forming a durable, adherent photocatalytic coating on a substrate, comprising the steps of:
   a. providing (22, 28) a substrate (18) having at least one oxide surface (18');
   b. mixing (30) titania powder in a $TiO_2$ sol-gel solution to form a titania slurry;
   c. coating (30) the oxide surface of the substrate with the titania slurry; and
   d. heat treating (31) the coated substrate (18, 18', 20) by heating to a sufficient temperature for a sufficient interval to calcine, harden, and bond the titania coating to the substrate.

2. The method of claim 1 wherein the substrate (18) is metal and including the step of providing an oxide layer on at least one surface thereof.

3. The method of claim 2 wherein the metal substrate is aluminum and the step (28) of providing the substrate with an oxide layer is selected from the group of steps consisting of: growing a layer of $Al_2O_3$ on the aluminum substrate and selecting aluminum substrate having a pre-existing native layer of $Al_2O_3$.

4. The method of claim 3 wherein the step of growing a layer of $Al_2O_3$ on the aluminum substrate includes subjecting the substrate to a relative humidity of about 95% and a temperature of about 85° C. for about one hour.

5. The method of claim 1 wherein the $TiO_2$ sol-gel solution is provided by the steps comprising:
   a. mixing deionized water with $HNO_3$ to form a first solution;
   b. mixing $Ti(O\text{-}iPr)_4$ with (I—PrOH) to form a second solution;
   c. adding the second solution drop-wise to the first solution while stirring the the resulting mixture; and
   d. refluxing the resulting mixture at 80° C. for about 12 hours.

6. The method of claim 3 wherein the step (30) of coating the oxide surface of the aluminum substrate with the titania slurry comprises the step of dip coating.

7. The method of claim 1 wherein the loading of the titania powder in the titania slurry is maintained in the range from about 20 weight % to about 30 weight %.

8. The method of claim 1 wherein the step (31) of heat treating the titania slurry coating for calcining by heating the coated substrate comprises subjecting the coated substrate to a temperature in the range of about 150° C. to about 250° C. for at least two hours.

9. The method of claim 1 wherein the substrate (18) is aluminum and has a thickness of about 0.002 inch.

10. The method of forming a durable, adherent photocatalytic coating on a substrate, comprising the steps of:
   a. providing (22, 28) a substrate (18) having at least one oxide surface (18');
   b. mixing (30) a photocatalyst powder in a photocatalyst-precursor sol-gel solution to form a photocatalyst slurry;
   c. coating (30) the oxide surface of the substrate with the photocatalyst slurry; and
   d. heat treating (31) the coated substrate (18,18', 20) by heating to a sufficient temperature for a sufficient interval to calcine, harden, and bond the photocatalytic coating to the substrate.

11. The method of claim 10 wherein the substrate (18) is metal and including the step of providing an oxide layer on at least one surface thereof.

12. The method of claim 11 wherein the metal substrate is aluminum and the step (28) of providing the substrate with an oxide layer is selected from the group of steps consisting of:
   growing a layer of $Al_2O_3$ on the aluminum substrate and selecting aluminum substrate having a pre-existing native layer of $Al_2O_3$.

13. The method of claim 12 wherein the step of growing a layer of $Al_2O_3$ on the aluminum substrate includes subjecting the substrate to a relative humidity of about 95% and a temperature of about 85° C. for about one hour.

14. The method of claim 12 wherein the step (30) of coating the oxide surface of the aluminum substrate with the photocatalyst slurry comprises the step of dip coating.

15. The method of claim 10 wherein the photocatalyst-precursor sol-gel solution is provided by the steps comprising:
   a. mixing deionized water with $HNO_3$ to form a first solution;
   b. mixing an organometallic of the photocatalyst with a corresponding alcohol to form a second solution;
   c. adding the second solution drop-wise to the first solution while stirring the resulting mixture; and
   d. refluxing the resulting mixture for an interval at a temperature above room temperature.

16. The method of claim 15 wherein the organometallic of the photocatalyst is an isopropoxide of the photocatalyst, the corresponding alcohol of the isopropoxide is propanol, and refluxing said resulting mixture of said first and second solutions for about 12 hours at about 80° C.

17. The method of claim 10 wherein the loading of the photocatalyst powder in the photocatalyst slurry is maintained in the range from about 20 weight % to about 30 weight %.

18. The method of claim 10 wherein the step (31) of heat treating the photocatalyst slurry coating for calcining by heating the coated substrate comprises subjecting the coated substrate to a temperature in the range of about 150° C. to about 250° C. for at least two hours.

19. The method of claim 10 wherein the aluminum substrate (18) has a thickness of about 0.002 inch.

* * * * *